US009830262B2

(12) United States Patent
Duluk, Jr. et al.

(10) Patent No.: US 9,830,262 B2
(45) Date of Patent: Nov. 28, 2017

(54) ACCESS TRACKING MECHANISM FOR HYBRID MEMORIES IN A UNIFIED VIRTUAL SYSTEM

(71) Applicant: NVIDIA CORPORATION, Santa Clara, CA (US)

(72) Inventors: Jerome F. Duluk, Jr., Palo Alto, CA (US); Cameron Buschardt, Round Rock, TX (US); James Leroy Deming, Madison, AL (US); Brian Fahs, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 44 days.

(21) Appl. No.: 14/133,488

(22) Filed: Dec. 18, 2013

(65) Prior Publication Data

US 2014/0281264 A1  Sep. 18, 2014

Related U.S. Application Data

(60) Provisional application No. 61/785,463, filed on Mar. 14, 2013, provisional application No. 61/800,004, filed on Mar. 15, 2013.

(51) Int. Cl.
*G06F 12/08* (2016.01)
*G06F 11/30* (2006.01)
*G06F 11/34* (2006.01)

(52) U.S. Cl.
CPC .......... *G06F 12/08* (2013.01); *G06F 11/3037* (2013.01); *G06F 11/3442* (2013.01); *G06F 11/3471* (2013.01); *G06F 2201/81* (2013.01); *G06F 2201/815* (2013.01); *G06F 2212/205* (2013.01)

(58) Field of Classification Search
None
See application file for complete search history.

(56) References Cited

U.S. PATENT DOCUMENTS

| 2003/0033486 | A1* | 2/2003 | Mizrachi | G06F 12/0842 711/133 |
| 2006/0259728 | A1* | 11/2006 | Chandrasekaran et al. | 711/170 |
| 2010/0138614 | A1* | 6/2010 | Glasco et al. | 711/144 |
| 2011/0179219 | A1* | 7/2011 | Ma et al. | 711/103 |

* cited by examiner

*Primary Examiner* — Daniel Tsui
*Assistant Examiner* — Edward Wang
(74) *Attorney, Agent, or Firm* — Artegis Law Group, LLP

(57) ABSTRACT

Embodiments of the approaches disclosed herein include a subsystem that includes an access tracking mechanism configured to monitor access operations directed to a first memory and a second memory. The access tracking mechanism detects an access operation generated by a processor for accessing a first memory page residing on the second memory. The access tracking mechanism further determines that the first memory page is included in a first subset of memory pages residing on the second memory. The access tracking mechanism further locates, within a reference vector, a reference bit that corresponds to the first memory page, and sets the reference bit. One advantage of the present invention is that memory pages in a hybrid system migrate as needed to increase overall memory performance.

23 Claims, 8 Drawing Sheets

ACCESS TRACKING MECHANISM FOR HYBRID MEMORIES IN A UNIFIED VIRTUAL SYSTEM

CROSS-REFERENCE TO RELATED APPLICATIONS

This application claims the benefit of U.S. provisional patent application entitled "MIGRATION COUNTERS FOR HYBRID MEMORIES IN A UNIFIED VIRTUAL MEMORY SYSTEM," Ser. No. 61/785,463, filed Mar. 14, 2013, and of U.S. provisional patent application entitled "CPU-TO-GPU AND GPU-TO-GPU ATOMICS," Ser. No. 61/800,004, filed Mar. 15, 2013, both of which are hereby incorporated herein by reference.

BACKGROUND OF THE INVENTION

Field of the Invention

Embodiments of the present invention relate generally to computer science and, more specifically, to migration counters for hybrid memories in a unified virtual memory system.

Description of the Related Art

Computing systems often include a hybrid memory system where one or more processing units access a first memory with a relatively large storage capacity and long access times and a second memory with a relatively small storage capacity and low access times. Software applications executing in the processing units may allocate memory in such a fashion as to store larger data structures in the first memory, as well as data that is accessed relatively rarely. Likewise, software applications may allocate memory as to store smaller data structures in the second memory, as well as data that is accessed relatively frequently.

One drawback with this approach is that a software application, operating system, and driver software may not know, a priori, which data structures are relatively large or small, or the frequency at which various data are accessed. In addition, a particular data structure may include memory pages that are accessed relatively rarely along with memory pages that are accessed relatively frequently. Finally, the frequency at which a given memory page is accessed may increase or decrease over time, such that a memory page initially well-suited for allocation in the larger, slower memory may later be better suited for allocation in the smaller, faster memory, and vice versa. As such, some memory pages accessed with relative frequency may, nevertheless, be allocated to the larger, slower memory, while other pages accessed relatively rarely may be allocated to the smaller, faster memory.

Accordingly, what is needed in the art is a more effective way to allocate memory pages in a hybrid memory system.

SUMMARY OF THE INVENTION

One embodiment of the present invention sets forth a subsystem that includes an access tracking mechanism configured to monitor access operations directed to a first memory and a second memory. The access tracking mechanism detects an access operation generated by a processor for accessing a first memory page residing on the second memory. The access tracking mechanism further determines that the first memory page is included in a first subset of memory pages residing on the second memory. The access tracking mechanism further locates, within a reference vector, a reference bit that corresponds to the first memory page, and sets the reference bit.

Other embodiments include, without limitation, a method for causing memory pages to migrate between a first memory and a second memory, and a computing device comprising an access tracking unit that implements one or more aspects of the disclosed methods.

One advantage of the disclosed approach is that memory pages in a hybrid system migrate as needed to increase overall memory performance. Memory pages accessed with relative frequency migrate from a larger memory with relatively high latency to a smaller memory with relatively low frequency, while memory pages in the smaller memory that are not accessed during a measurement interval migrate back to the larger memory.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

System Overview

Figure 1:
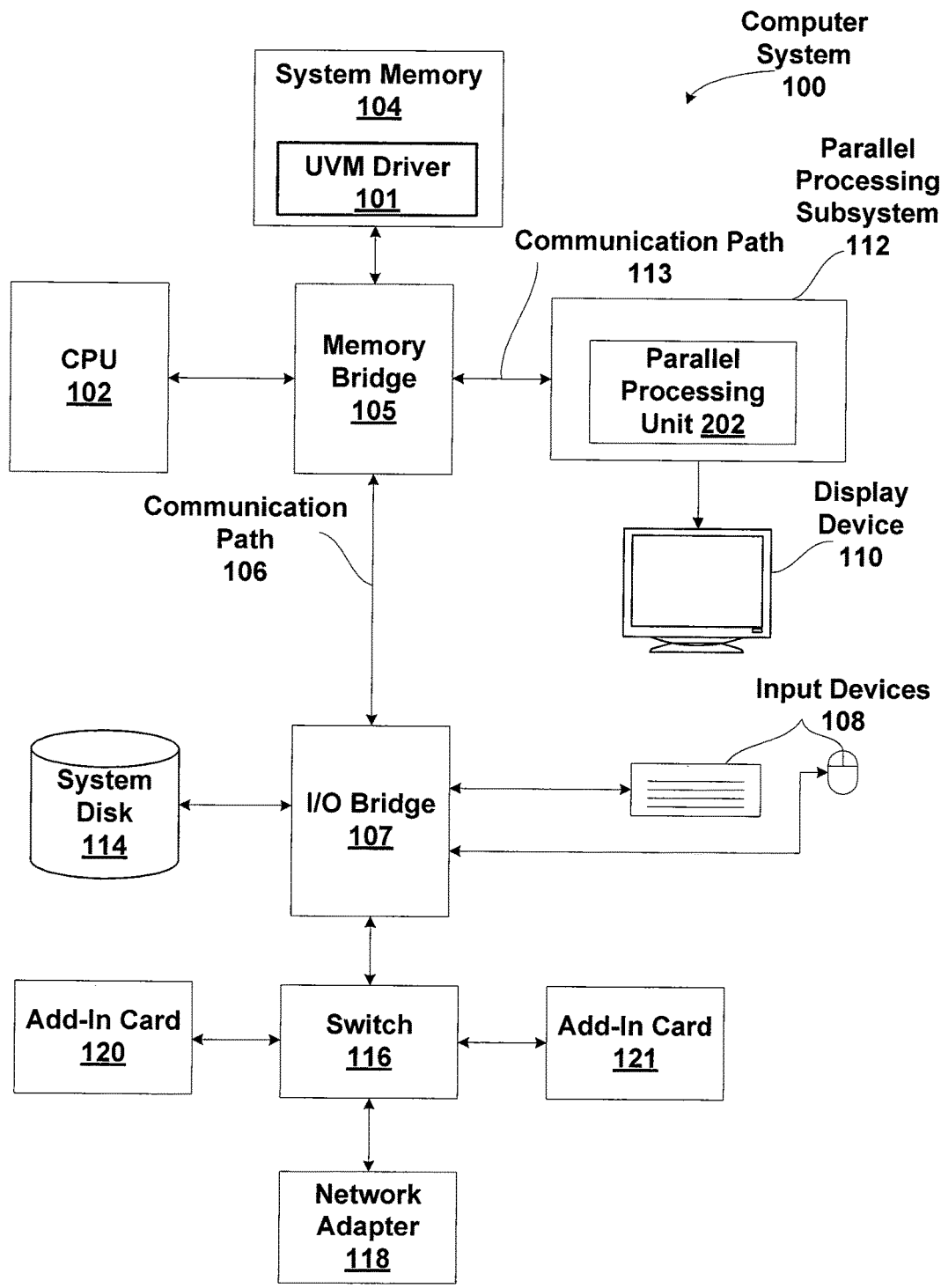
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes one or more parallel processing units (PPUs) 202. In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC). As is well-known, many graphics processing units (GPUs) are designed to perform parallel operations and computations and, thus, are considered to be a class of parallel processing unit (PPU).

Any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

PPU 202 advantageously implements a highly parallel processing architecture. PPU 202 includes a number of general processing clusters (GPCs). Each GPC is capable of executing a large number (e.g., hundreds or thousands) of threads concurrently, where each thread is an instance of a program. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads. Unlike a SIMD execution regime, where all processing engines typically execute identical instructions, SIMT execution allows different threads to more readily follow divergent execution paths through a given thread program.

GPCs include a number of streaming multiprocessors (SMs), where each SM is configured to process one or more thread groups. The series of instructions transmitted to a particular GPC constitutes a thread, as previously defined herein, and the collection of a certain number of concurrently executing threads across the parallel processing engines within an SM is referred to herein as a "warp" or "thread group." As used herein, a "thread group" refers to a group of threads concurrently executing the same program on different input data, with one thread of the group being assigned to a different processing engine within an SM. Additionally, a plurality of related thread groups may be active (in different phases of execution) at the same time within an SM. This collection of thread groups is referred to herein as a "cooperative thread array" ("CTA") or "thread array."

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

In operation, CPU 102 is the master processor of computer system 100, controlling and coordinating operations of other system components. In particular, CPU 102 issues commands that control the operation of PPUs 202. In one embodiment, communication path 113 is a PCI Express link, in which dedicated lanes are allocated to each PPU 202, as is known in the art. Other communication paths may also be used. PPU 202 advantageously implements a highly parallel processing architecture. A PPU 202 may be provided with any amount of local parallel processing memory (PPU memory).

In some embodiments, system memory 104 includes a unified virtual memory (UVM) driver 101. The UVM driver 101 includes instructions for performing various tasks related to management of a unified virtual memory (UVM) system common to both the CPU 102 and the PPUs 202. Among other things, the architecture enables the CPU 102 and the PPU 202 to access a physical memory location using a common virtual memory address, regardless of whether the physical memory location is within the system memory 104 or memory local to the PPU 202.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Unified Virtual Memory System Architecture

Figure 2:
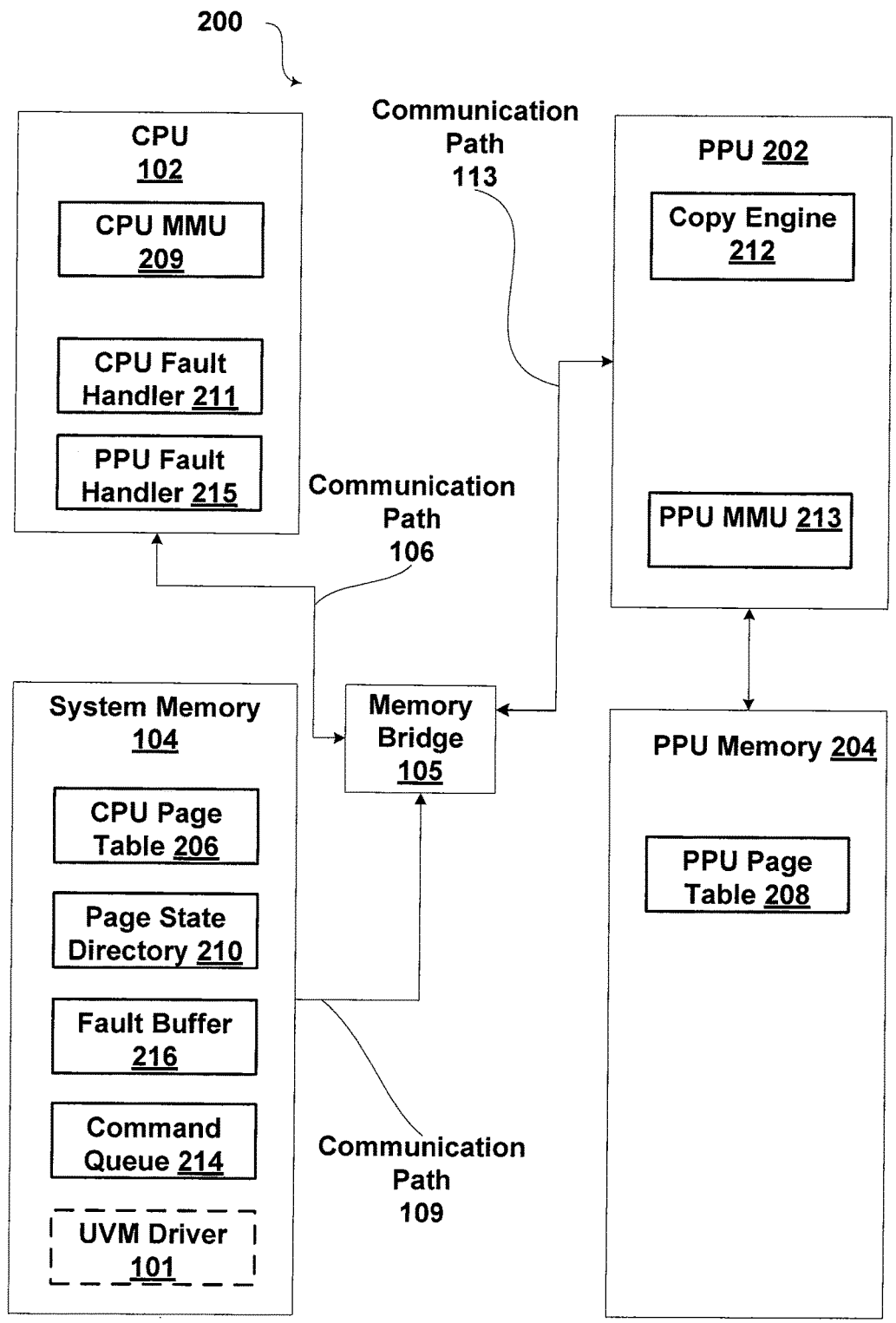
FIG. 2 is a block diagram illustrating a unified virtual memory system, according to one embodiment of the present invention.

FIG. 2 is a block diagram illustrating a unified virtual memory (UVM) system 200, according to one embodiment of the present invention. As shown, the unified virtual memory system 200 includes, without limitation, the CPU 102, the system memory 104, and the parallel processing unit (PPU) 202 coupled to a parallel processing unit memory (PPU memory) 204. The CPU 102 and the system memory 104 are coupled to each other and to the PPU 202 via the memory bridge 105.

The CPU 102 executes threads that may request data stored in the system memory 104 or the PPU memory 204 via a virtual memory address. Virtual memory addresses shield threads executing in the CPU 102 from knowledge about the internal workings of a memory system. Thus, a thread may only have knowledge of virtual memory addresses, and may access data by requesting data via a virtual memory address.

The CPU 102 includes a CPU MMU 209, which processes requests from the CPU 102 for translating virtual memory addresses to physical memory addresses. The physical memory addresses are required to access data stored in a physical memory unit such as the system memory 104 and the PPU memory 204. The CPU 102 includes a CPU fault handler 211, which executes steps in response to the CPU MMU 209 generating a page fault, to make requested data available to the CPU 102. The CPU fault handler 211 is generally software that resides in the system memory 104 and executes on the CPU 102, the software being provoked by an interrupt to the CPU 102.

The system memory 104 stores various memory pages (not shown) that include data for use by threads executing on the CPU 102 or the PPU 202. As shown, the system memory 104 stores a CPU page table 206, which includes mappings between virtual memory addresses and physical memory addresses. The system memory 104 also stores a page state directory 210, which acts as a "master page table" for the UVM system 200, as is discussed in greater detail below. The system memory 104 stores a fault buffer 216, which includes entries written by the PPU 202 in order to inform the CPU 102 of a page fault generated by the PPU 202. In some embodiments, the system memory 104 includes the unified virtual memory (UVM) driver 101, which includes instructions that, when executed, cause the CPU 102 to execute commands for, among other things, remedying a page fault. In alternative embodiments, any combination of the page state directory 210, the fault buffer 216, and one or more command queues 214 may be stored in the PPU memory 204. Further, a PPU page table 208 may be stored in the system memory 104.

In a similar manner as with the CPU 102, the PPU 202 executes instructions that may request data stored in the system memory 104 or the PPU memory 204 via a virtual memory address. The PPU 202 includes a PPU MMU 213, which processes requests from the PPU 202 for translating virtual memory addresses to physical memory addresses. The PPU 202 also includes a copy engine 212, which executes commands stored in the command queue 214 for copying memory pages, modifying data in the PPU page table 208, and other commands. A PPU fault handler 215 executes steps in response to a page fault on the PPU 202. The PPU fault handler 215 can be software running on a processor or dedicated microcontroller in the PPU 202. Alternatively, the PPU fault handler 215 can be combination of software running on the CPU 102 and software running on the dedicated microcontroller in the PPU 202, communicating with each other. In some embodiments, the CPU fault handler 211 and the PPU fault handler 215 can be a unified software program that is invoked by a fault on either the CPU 102 or the PPU 202. The command queue 214 may be in either the PPU memory 204 or the system memory 104, but is preferentially located in the system memory 104.

In some embodiments, the CPU fault handler 211 and the UVM driver 101 may be a unified software program. In such cases, the unified software program may be software that resides in the system memory 104 and executes on the CPU 102. The PPU fault handler 215 may be a separate software program running on a processor or dedicated microcontroller in the PPU 202, or the PPU fault handler 215 may be a separate software program running on the CPU 102.

In other embodiments, the PPU fault handler 215 and the UVM driver 101 may be a unified software program. In such cases, the unified software program may be software that resides in the system memory 104 and executes on the CPU 102. The CPU fault handler 211 may be a separate software program that resides in the system memory 104 and executes on the CPU 102.

In other embodiments, the CPU fault handler 211, the PPU fault handler 215, and the UVM driver 101 may be a unified software program. In such cases, the unified software program may be software that resides in the system memory 104 and executes on the CPU 102.

In some embodiments, the CPU fault handler 211, the PPU fault handler 215, and the UVM driver 101 may all reside in system memory 104, as described above. As shown in FIG. 2, the UVM driver 101 resides in system memory 104, while the CPU fault handler 211 and the PPU fault handler 215 reside in the CPU 102.

The CPU fault handler 211 and the PPU fault handler 215 are responsive to hardware interrupts that may emanate from the CPU 102 or the PPU 202, such as interrupts resulting from a page fault. As further described below, the UVM driver 101 includes instructions for performing various tasks related to management of the UVM system 200, including, without limitation, remedying a page fault, and accessing the CPU page table 206, the page state directory 210, and/or the fault buffer 216.

In some embodiments, the CPU page table 206 and the PPU page table 208 have different formats, and contain different information; for example, the PPU page table 208 may contain the following while the CPU page table 206 does not: atomic disable bit; compression tags; and memory swizzling type.

In a similar manner as with the system memory 104, the PPU memory 204 stores various memory pages (not shown). As shown, the PPU memory 204 also includes the PPU page table 208, which includes mappings between virtual memory addresses and physical memory addresses. Alternatively, the PPU page table 208 may be stored in the system memory 104.

Translating Virtual Memory Addresses

When a thread executing in the CPU 102 requests data via a virtual memory address, the CPU 102 requests translation of the virtual memory address to a physical memory address, from the CPU memory management unit (CPU MMU) 209. In response, the CPU MMU 209 attempts to translate the virtual memory address into a physical memory address, which specifies a location in a memory unit, such as the system memory 104, that stores the data requested by the CPU 102.

To translate a virtual memory address to a physical memory address, the CPU MMU 209 performs a lookup operation to determine if the CPU page table 206 includes a mapping associated with the virtual memory address. In addition to a virtual memory address, a request to access data may also indicate a virtual memory address space. The unified virtual memory system 200 may implement multiple virtual memory address spaces, each of which is assigned to one or more threads. Virtual memory addresses are unique within any given virtual memory address space. Further, virtual memory addresses within a given virtual memory address space are consistent across the CPU 102 and the PPU 202, thereby allowing the same virtual address to refer to the same data across the CPU 102 and the PPU 202. In some embodiments, two virtual memory addresses may refer to the same data, but may not map to the same physical memory address (e.g., the CPU 102 and the PPU 202 may each have a local read-only copy of the data.)

For any given virtual memory address, the CPU page table 206 may or may not include a mapping between the virtual memory address and a physical memory address. If the CPU page table 206 includes a mapping, then the CPU MMU 209 reads that mapping to determine a physical memory address associated with the virtual memory address and provides that physical memory address to the CPU 102. However, if the CPU page table 206 does not include a mapping associated with the virtual memory address, then the CPU MMU 209 is unable to translate the virtual memory address into a physical memory address, and the CPU MMU 209 generates a page fault. To remedy a page fault and make the requested data available to the CPU 102, a "page fault sequence" is executed. More specifically, the CPU 102 reads the PSD 210 to find the current mapping state of the page and then determines the appropriate page fault sequence. The page fault sequence generally maps the memory page associated with the requested virtual memory address or changes the types of accesses permitted (e.g., read access, write access, atomic access). The different types of page fault sequences implemented in the UVM system 200 are discussed in greater detail below.

Within the UVM system 200, data associated with a given virtual memory address may be stored in the system memory 104, in the PPU memory 204, or in both the system memory 104 and the PPU memory 204 as read-only copies of the same data. Further, for any such data, either or both of the CPU page table 206 or the PPU page table 208 may include a mapping associated with that data. Notably, some data exists for which a mapping exists in one page table, but not in the other. However, the PSD 210 includes all mappings stored in the PPU page table 208, and the PPU-relevant mappings stored in the CPU page table 206. The PSD 210 thus functions as a "master" page table for the unified virtual memory system 200. Therefore, when the CPU MMU 209 does not find a mapping in the CPU page table 206 associated with a particular virtual memory address, the CPU 102 reads the PSD 210 to determine whether the PSD 210 includes a mapping associated with that virtual memory address. Various embodiments of the PSD 210 may include different types of information associated with virtual memory addresses in addition to mappings associated with the virtual memory address.

When the CPU MMU 209 generates a page fault, the CPU fault handler 211 executes a sequence of operations for the appropriate page fault sequence to remedy the page fault. Again, during a page fault sequence, the CPU 102 reads the PSD 210 and executes additional operations in order to change the mappings or permissions within the CPU page table 206 and the PPU page table 208. Such operations may include reading and/or modifying the CPU page table 206, reading and/or modifying page state directory 210 entries, and/or migrating blocks of data referred to as "memory pages" between memory units (e.g., the system memory 104 and the PPU memory 204).

To determine which operations to execute in a page fault sequence, the CPU 102 identifies the memory page associated with the virtual memory address. The CPU 102 then reads state information for the memory page from the PSD 210 related to the virtual memory address associated with the memory access request that caused the page fault. Such state information may include, among other things, an ownership state for the memory page associated with the virtual memory address. For any given memory page, several ownership states are possible. For example, a memory page may be "CPU-owned," "PPU-owned," or "CPU-shared." A memory page is considered CPU-owned if the CPU 102 can access the memory page via a virtual address, and if the PPU 202 cannot access the memory page via a virtual address without causing a page fault. Preferably, a CPU-owned page resides in the system memory 104, but can reside in the PPU memory 204. A memory page is considered PPU-owned if the PPU 202 can access the page via a virtual address, and if the CPU 102 cannot access the memory page via a virtual address without causing a page fault. Preferably, a PPU-owned page resides in the PPU memory 204, but can reside in the system memory 104 when migration from the system memory 104 to the PPU memory 204 is not done, generally due to the short-term nature of the PPU ownership. Finally, a memory page is considered CPU-shared if the memory page is stored in the system memory 104 and a mapping to the memory page exists in the PPU page table 208 that allows the PPU 202 to access the memory page in the system memory 104 via a virtual memory address.

The UVM system 200 may assign ownership states to memory pages based on a variety of factors, including the usage history of the memory page. Usage history may include information regarding whether the CPU 102 or the PPU 202 accessed the memory page recently, and how many times such accesses were made. For example, the UVM system 200 may assign an ownership state of "CPU-owned" for a given memory page and locate the page in system memory 104 if, based on the usage history of the memory page, the UVM system 200 determines that the memory page is likely to be used mostly or only by the CPU 102. Similarly, the UVM system 200 may assign an ownership of "PPU-owned" for a given memory page and locate the page in PPU memory 204 if, based on the usage history of the memory page, the UVM system 200 determines that the memory page is likely to be used mostly or only by the PPU 202. Finally, the UVM system 200 may assign an ownership of "CPU-shared" for a given memory page if, based on the usage history of the memory page, the UVM system 200 determines that the memory page is likely to be used both by the CPU 102 and by the PPU 202, and that migrating the memory page back and forth from the system memory 104 to the PPU memory 204 would consume too much time.

As examples, the fault handlers 211 and 215 can implement any or all of the following heuristics for migrating:

(a) on the CPU 102 access to an unmapped page that is mapped to the PPU 202, that has not been recently migrated, unmap the faulting page from the PPU 202, migrate the page to the CPU 102, and map the page to the CPU 102;

(b) on the PPU 202 access to an unmapped page that is mapped to the CPU 102, that has not been recently migrated, unmap the faulting page from the CPU 102, migrate the page to the PPU 202, and map the page to the PPU 202;

(c) on the CPU 102 access to an unmapped page that is mapped to the PPU 202, that has been recently migrated, migrate the faulting page to the CPU 102 and map the page on both the CPU 102 and the PPU 202;

(d) on the PPU 102 access to an unmapped page that is mapped on the CPU 102, that has been recently migrated, map the page to both the CPU 102 and the PPU 202;

(e) on the PPU 102 atomic access to a page that is mapped to both the CPU 102 and the PPU 202 but not enabled for atomic operations by the PPU 202, unmap the page from the CPU 102, and map the page to the PPU 202 with atomic operations enabled;

(f) on the PPU 102 write access to a page that is mapped on the CPU 102 and PPU 202 as copy-on-write (COW), copy the page to the PPU 202, thereby making independent copies of the page, map the new page as read-write on the PPU, and leave the current page as mapped on the CPU 102;

(g) on the PPU 102 read access to a page that is mapped on the CPU 102 and PPU 202 as zero-fill-on-demand (ZFOD), allocate a page of physical memory on the PPU 202 and fill it with zeros, and map that page on the PPU, but change it to unmapped on the CPU 102;

(h) on an access by a first PPU 202(1) to an unmapped page that is mapped on a second PPU 202(2), that has not been recently migrated, unmap the faulting page from the second PPU 202(2), migrate the page to the first PPU 202(1), and map the page to the first PPU 202(1); and (i) on an access by a first PPU 202(1) to an unmapped page that is mapped on a second PPU 202(2), that has been recently migrated, map the faulting page to the first PPU 202(1), and keep the mapping of the page on the second PPU 202(2).

In sum, many heuristic rules are possible, and the scope of the present invention is not limited to these examples.

In addition, any migration heuristic can "round up" to include more pages or a larger page size, for example:

(j) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, and map the pages to the CPU 102 (in more detailed example: for a 4 kB faulted page, migrate the aligned 64 kB region that includes the 4 kB faulted page);

(k) on the PPU 202 access to an unmapped page that is mapped to the CPU 102, that has not been recently migrated, unmap the faulting page, plus additional pages that are adjacent to the faulting page in the virtual address space, from the CPU 102, migrate the pages to the PPU 202, and map the pages to the PPU 202 (in more detailed example: for a 4 kB faulted page, migrate the aligned 64 kB region that includes the 4 kB faulted page);

(l) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, map the pages to the CPU 102, and treat all the migrated pages as one or more larger pages on the CPU 102 (in more detailed example: for a 4 kB faulted page, migrate the aligned 64 kB region that includes the 4 kB faulted page, and treat the aligned 64 kB region as a 64 kB page);

(m) on the PPU 202 access to an unmapped page that is mapped on the CPU 102, that has not been recently migrated, unmap the faulting page, plus additional pages that are adjacent to the faulting page in the virtual address space, from the CPU 102, migrate the pages to the PPU 202, map the pages to the PPU 202, and treat all the migrated pages as one or more larger pages on the PPU 202 (in more detailed example: for a 4 kB faulted page, migrate the aligned 64 kB region that includes the 4 kB faulted page, and treat the aligned 64 kB region as a 64 kB page);

(n) on the access by a first PPU 202(1) to an unmapped page that is mapped to a second PPU 202(2), that has not been recently migrated, unmap the faulting page, plus additional pages that are adjacent to the faulting page in the virtual address space, from the second PPU 202(2), migrate the pages to the first PPU 202(1), and map the pages to the first PPU 202(1); and (o) on an access by a first PPU 202(1) to an unmapped page that is mapped to a second PPU 202(2), that has been recently migrated, map the faulting page, plus additional pages that are adjacent to the faulting page in the virtual address space, to the first PPU 202(1), and keep the mapping of the page on the second PPU 202(2).

In sum, many heuristic rules that include "rounding up" are possible, and scope of the present invention is not limited to these examples.

In some embodiments, the PSD entries may include transitional state information to ensure proper synchronization between various requests made by units within the CPU 102 and the PPU 202. For example, a PSD 210 entry may include a transitional state indicating that a particular page is in the process of being transitioned from CPU-owned to PPU-owned. Various units in the CPU 102 and the PPU 202, such as the CPU fault handler 211 and the PPU fault handler 215, upon determining that a page is in such a transitional state, may forego portions of a page fault sequence to avoid steps in a page fault sequence triggered by a prior virtual memory access to the same virtual memory address. As a specific example, if a page fault results in a page being migrated from the system memory 104 to the PPU memory 204, a different page fault that would cause the same migration is detected and does not cause another page migration. Further, various units in the CPU 102 and the PPU 202 may implement atomic operations for proper ordering of operations on the PSD 210. For example, for modifications to PSD 210 entries, the CPU fault handler 211 or the PPU fault handler 215 may issue an atomic compare and swap operation to modify the page state of a particular entry in the PSD 210. Consequently, the modification is done without interference by operations from other units.

Multiple PSDs 210 may be stored in the system memory 104—one for each virtual memory address space. A memory access request generated by either the CPU 102 or the PPU 202 may therefore include a virtual memory address and also identify the virtual memory address space associated with that virtual memory address.

Just as the CPU 102 may execute memory access requests that include virtual memory addresses (i.e., instructions that include requests to access data via a virtual memory address), the PPU 202 may also execute similar types of memory access requests. More specifically, the PPU 202 includes a plurality of execution units, such as GPCs and SMs, described above in conjunction with FIG. 1, that are configured to execute multiple threads and thread groups. In operation, those threads may request data from memory (e.g., the system memory 104 or the PPU memory 204) by specifying a virtual memory address. Just as with the CPU 102 and the CPU MMU 209, the PPU 202 includes the PPU memory management unit (MMU) 213. The PPU MMU 213 receives requests for translation of virtual memory addresses from the PPU 202, and attempts to provide a translation from the PPU page table 208 for the virtual memory addresses.

Similar to the CPU page table 206, the PPU page table 208 includes mappings between virtual memory addresses and physical memory addresses. As is also the case with the CPU page table 206, for any given virtual address, the PPU page table 208 may not include a page table entry that maps the virtual memory address to a physical memory address. As with the CPU MMU 209, when the PPU MMU 213 requests a translation for a virtual memory address from the PPU page table 208 and either no mapping exists in the PPU page table 208 or the type of access is not allowed by the PPU page table 208, the PPU MMU 213 generates a page fault. Subsequently, the PPU fault handler 215 triggers a page fault sequence. Again, the different types of page fault sequences implemented in the UVM system 200 are described in greater detail below.

During a page fault sequence, the CPU 102 or the PPU 202 may write commands into the command queue 214 for execution by the copy engine 212. Such an approach frees up the CPU 102 or the PPU 202 to execute other tasks while the copy engine 212 reads and executes the commands stored in the command queue 214, and allow all the commands for a fault sequence to be queued at one time, thereby avoiding the monitoring of progress of the fault sequence. Commands executed by the copy engine 212 may include, among other things, deleting, creating, or modifying page table entries in the PPU page table 208, reading or writing data from the system memory 104, and reading or writing data to the PPU memory 204.

The fault buffer 216 stores fault buffer entries that indicate information related to page faults generated by the PPU 202. Fault buffer entries may include, for example, the type of access that was attempted (e.g., read, write, or atomic), the virtual memory address for which an attempted access caused a page fault, the virtual address space, and an indication of a unit or thread that caused a page fault. In operation, when the PPU 202 causes a page fault, the PPU 202 may write a fault buffer entry into the fault buffer 216 to inform the PPU fault handler 215 about the faulting page and the type of access that caused the fault. The PPU fault handler 215 then performs actions to remedy the page fault. The fault buffer 216 can store multiple faults because the PPU 202 is executing a plurality of threads, where each thread can cause a one or more faults due the pipelined nature of the memory accesses of the PPU 202.

Page Fault Sequences

As stated above, in response to receiving a request for translation of a virtual memory address, the CPU MMU 209 generates a page fault if the CPU page table 206 does not include a mapping associated with the requested virtual memory address or does not permit the type of access being requested. Similarly, in response to receiving a request for translation of a virtual memory address, the PPU MMU 213 generates a page fault if the PPU page table 208 does not include a mapping associated with the requested virtual memory address or does not permit the type of access being requested. When the CPU MMU 209 or the PPU MMU 213 generates a page fault, the thread that requested the data at the virtual memory address stalls, and a "local fault handler"—the CPU fault handler 211 for the CPU 102 or the PPU fault handler 215 for the PPU 202—attempts to remedy the page fault by executing a "page fault sequence." As indicated above, a page fault sequence includes a series of operations that enable the faulting unit (i.e., the unit—either the CPU 102 or the PPU 202—that caused the page fault) to access the data associated with the virtual memory address. After the page fault sequence completes, the thread that requested the data via the virtual memory address resumes execution. In some embodiments, fault recovery is simplified by allowing the fault recovery logic to track faulting memory accesses as opposed to faulting instructions.

The operations executed during a page fault sequence depend on the change in ownership state or change in access permissions, if any, that the memory page associated with the page fault has to undergo. The transition from a current ownership state to a new ownership state, or a change in access permissions, may be part of the page fault sequence. In some instances, migrating the memory page associated with the page fault from the system memory 104 to the PPU memory 204 is also part of the page fault sequence. In other instances, migrating the memory page associated with the page fault from the PPU memory 204 to the system memory 104 is also part of the page fault sequence. Various heuristics, more fully described herein, may be used to configure UVM system 200 to change memory page ownership state or to migrate memory pages under various sets of operating conditions and patterns. Described in greater detail below are page fault sequences for the following four memory page ownership state transitions: CPU-owned to CPU-shared, CPU-owned to PPU-owned, PPU-owned to CPU-owned, and PPU-owned to CPU-shared.

A fault by the PPU 202 may initiate a transition from CPU-owned to CPU-shared. Prior to such a transition, a thread executing in the PPU 202 attempts to access data at a virtual memory address that is not mapped in the PPU page table 208. This access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state as well as other factors, such as usage characteristics for the memory page or the type of memory access, the PPU fault handler 215 determines that a new ownership state for the page should be CPU-shared.

To change the ownership state, the PPU fault handler 215 writes a new entry in the PPU page table 208 corresponding to the virtual memory address and associating the virtual memory address with the memory page identified via the PSD 210 entry. The PPU fault handler 215 also modifies the PSD 210 entry for that memory page to indicate that the ownership state is CPU-shared. In some embodiments, an entry in a translation look-aside buffer (TLBs) in the PPU 202 is invalidated to account for the case where the translation to an invalid page is cached. At this point, the page fault sequence is complete. The ownership state for the memory page is CPU-shared, meaning that the memory page is accessible to both the CPU 102 and the PPU 202. Both the CPU page table 206 and the PPU page table 208 include entries that associate the virtual memory address to the memory page.

A fault by the PPU 202 may initiate a transition from CPU-owned to PPU-owned. Prior to such a transition, an operation executing in the PPU 202 attempts to access memory at a virtual memory address that is not mapped in the PPU page table 208. This memory access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state, as well as other factors, such as usage characteristics for the page or the type of memory access, the PPU fault handler 215 determines that a new ownership state for the page is PPU-owned.

To change the ownership state, the CPU 102 removes the mapping in the CPU page table 206 associated with the virtual memory address that caused the page fault. The CPU 102 may flush caches before and/or after the mapping is removed. The CPU 102 also writes commands into the command queue 214 instructing the PPU 202 to copy the page from the system memory 104 into the PPU memory 204. The copy engine 212 in the PPU 202 reads the commands in the command queue 214 and copies the page from the system memory 104 to the PPU memory 204. The PPU 202 writes a page table entry into the PPU page table 208 corresponding to the virtual memory address and associating the virtual memory address with the newly-copied memory page in the PPU memory 204. The writing to the PPU page table 208 may be done via the copy engine 212. Alternatively, the CPU 102 can update the PPU page table 208. The PPU fault handler 215 also modifies the PSD 210 entry for that memory page to indicate that the ownership state is PPU-owned. In some embodiments, entries in TLBs in the PPU 202 or the CPU 102 may be invalidated, to account for the case where the translation was cached. At this point, the page fault sequence is complete. The ownership state for the memory page is PPU-owned, meaning that the memory page is accessible only to the PPU 202. Only the PPU page table 208 includes an entry that associates the virtual memory address with the memory page.

A fault by the CPU 102 may initiate a transition from PPU-owned to CPU-owned. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state, as well as other factors, such as usage characteristics for the page or the type of access, the CPU fault handler 211 determines that a new ownership state for the page is CPU-owned.

The CPU fault handler 211 changes the ownership state associated with the memory page to CPU-owned. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104, which may be done via the command queue 214 and the copy engine 212. The CPU fault handler 211 writes a page table entry into the CPU page table 206 that associates the virtual memory address with the memory page that is copied into the system memory 104. The CPU fault handler 211 also updates the PSD 210 to associate the virtual memory address with the newly copied memory page. At this point, the page fault sequence is complete. The ownership state for the memory page is CPU-owned, meaning that the memory page is accessible only to the CPU 102. Only the CPU page table 206 includes an entry that associates the virtual memory address with the memory page.

A fault by the CPU 102 may initiate a transition from PPU-owned to CPU-shared. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state or the type of access, as well as other factors, such as usage characteristics for the page, the CPU fault handler 211 determines that a new ownership state for the memory page is CPU-shared.

The CPU fault handler 211 changes the ownership state associated with the memory page to CPU-shared. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104. This copy operation may be done via the command queue 214 and the copy engine 212. The CPU fault handler 211 then writes a command into the command queue 214 to cause the copy engine 212 to change the entry in PPU page table 208 such that the virtual memory address is associated with the memory page in the system memory 104. Various TLB entries may be invalidated. The CPU fault handler 211 writes a page table entry into the CPU page table 206 to associate the virtual memory address with the memory page in the system memory 104. The CPU fault handler 211 also updates the PSD 210 to associate the virtual memory address with the memory page in system memory 104. At this point, the page fault sequence is complete. The ownership state for the page is CPU-shared, and the memory page has been copied into the system memory 104. The page is accessible to the CPU 102, since the CPU page table 206 includes an entry that associates the virtual memory address with the memory page in the system memory 104. The page is also accessible to the PPU 202, since the PPU page table 208 includes an entry that associates the virtual memory address with the memory page in the system memory 104.

Detailed Example of a Page Fault Sequence

With this context, a detailed description of a page fault sequence executed by the PPU fault handler 215 in the event of a transition from CPU-owned to CPU-shared is now provided to show how atomic operations and transition states may be used to more effectively manage a page fault sequence. The page fault sequence is triggered by a PPU 202 thread attempting to access a virtual address for which a mapping does not exist in the PPU page table 208. When a thread attempts to access data via a virtual memory address, the PPU 202 (specifically, a user-level thread) requests a translation from the PPU page table 208. A PPU page fault occurs in response because the PPU page table 208 does not include a mapping associated with the requested virtual memory address.

After the page fault occurs, the thread enters a trap, stalls, and the PPU fault handler 215 executes a page fault sequence. The PPU fault handler 215 reads the PSD 210 to determine which memory page is associated with the virtual memory address and to determine the state for the virtual memory address. The PPU fault handler 215 determines, from the PSD 210, that the ownership state for that memory page is CPU-owned. Consequently, the data requested by the PPU 202 is inaccessible to the PPU 202 via a virtual memory address. State information for the memory page also indicates that the requested data cannot be migrated to the PPU memory 204.

Based on the state information obtained from the PSD 210, the PPU fault handler 215 determines that a new state for the memory page should be CPU-shared. The PPU fault handler 215 changes the state to "transitioning to CPU-shared." This state indicates that the page is currently in the process of being transitioned to CPU-shared. When the PPU fault handler 215 runs on a microcontroller in the memory management unit, then two processors will update the PSD 210 asynchronously, using atomic compare-and-swap ("CAS") operations on the PSD 210 to change the state to "transitioning to PPU visible," (CPU-shared).

The PPU 202 updates the PPU page table 208 to associate the virtual address with the memory page. The PPU 202 also invalidates the TLB cache entries. Next, the PPU 202 performs another atomic compare-and-swap operation on the PSD 210 to change the ownership state associated with the memory page to CPU-shared. Finally, the page fault sequence ends, and the thread that requested the data via the virtual memory address resumes execution.

UVM System Architecture Variations

Various modifications to the unified virtual memory system 200 are possible. For example, in some embodiments, after writing a fault buffer entry into the fault buffer 216, the PPU 202 may trigger a CPU interrupt to cause the CPU 102 to read fault buffer entries in the fault buffer 216 and perform whatever operations are appropriate in response to the fault buffer entry. In other embodiments, the CPU 102 may periodically poll the fault buffer 216. In the event that the CPU 102 finds a fault buffer entry in the fault buffer 216, the CPU 102 executes a series of operations in response to the fault buffer entry.

In some embodiments, the system memory 104, rather than the PPU memory 204, stores the PPU page table 208. In other embodiments, a single or multiple-level cache hierarchy, such as a single or multiple-level translation look-aside buffer (TLB) hierarchy (not shown), may be implemented to cache virtual address translations for either the CPU page table 206 or the PPU page table 208.

In yet other embodiments, in the event that a thread executing in the PPU 202 causes a PPU fault (a "faulting thread"), the PPU 202 may take one or more actions. These actions include: stall the entire PPU 202, stall the SM executing the faulting thread, stall the PPU MMU 213, stall only the faulting thread, or stall one or more levels of TLBs. In some embodiments, after a PPU page fault occurs, and a page fault sequence has been executed by the unified virtual memory system 200, execution of the faulting thread resumes, and the faulting thread attempts, again, to execute the memory access request that caused the page fault. In some embodiments, stalling at a TLB is done in such a way as to appear as a long-latency memory access to the faulting SM or faulting thread, thereby not requiring the SM to do any special operation for a fault.

Finally, in other alternative embodiments, the UVM driver 101 may include instructions that cause the CPU 102 to execute one or more operations for managing the UVM system 200 and remedying a page fault, such as accessing the CPU page table 206, the PSD 210, and/or the fault buffer 216. In other embodiments, an operating system kernel (not shown) may be configured to manage the UVM system 200 and remedy a page fault by accessing the CPU page table 206, the PSD 210, and/or the fault buffer 216. In yet other embodiments, an operating system kernel may operate in conjunction with the UVM driver 101 to manage the UVM system 200 and remedy a page fault by accessing the CPU page table 206, the PSD 210, and/or the fault buffer 21.

Unified Virtual Memory with Hybrid Memories

The techniques describe herein relate to techniques related to migration counters for hybrid memories in a unified virtual memory system. Among other things, the techniques enable frequently accessed pages in a main memory that is relatively slow and large to be identified, where such memory pages are candidates for migration from the slow and large memory to a relatively fast and small memory where the pages can be accessed with decreased latency. The techniques also enable infrequently accessed pages in a high speed memory that is relatively fast and small to be identified, where such memory pages are candidates for migration from the fast and small memory to a relatively slow and large memory. Such migrations make room in the fast and small memory for memory pages that are being accessed more frequently by the processing units within the system. In both scenarios, the targeted page migrations may increase overall system performance. Memory pages identified for migration may be copied from one memory to another memory by a software application or by a driver, such as the UVM driver 101.

Figure 3:
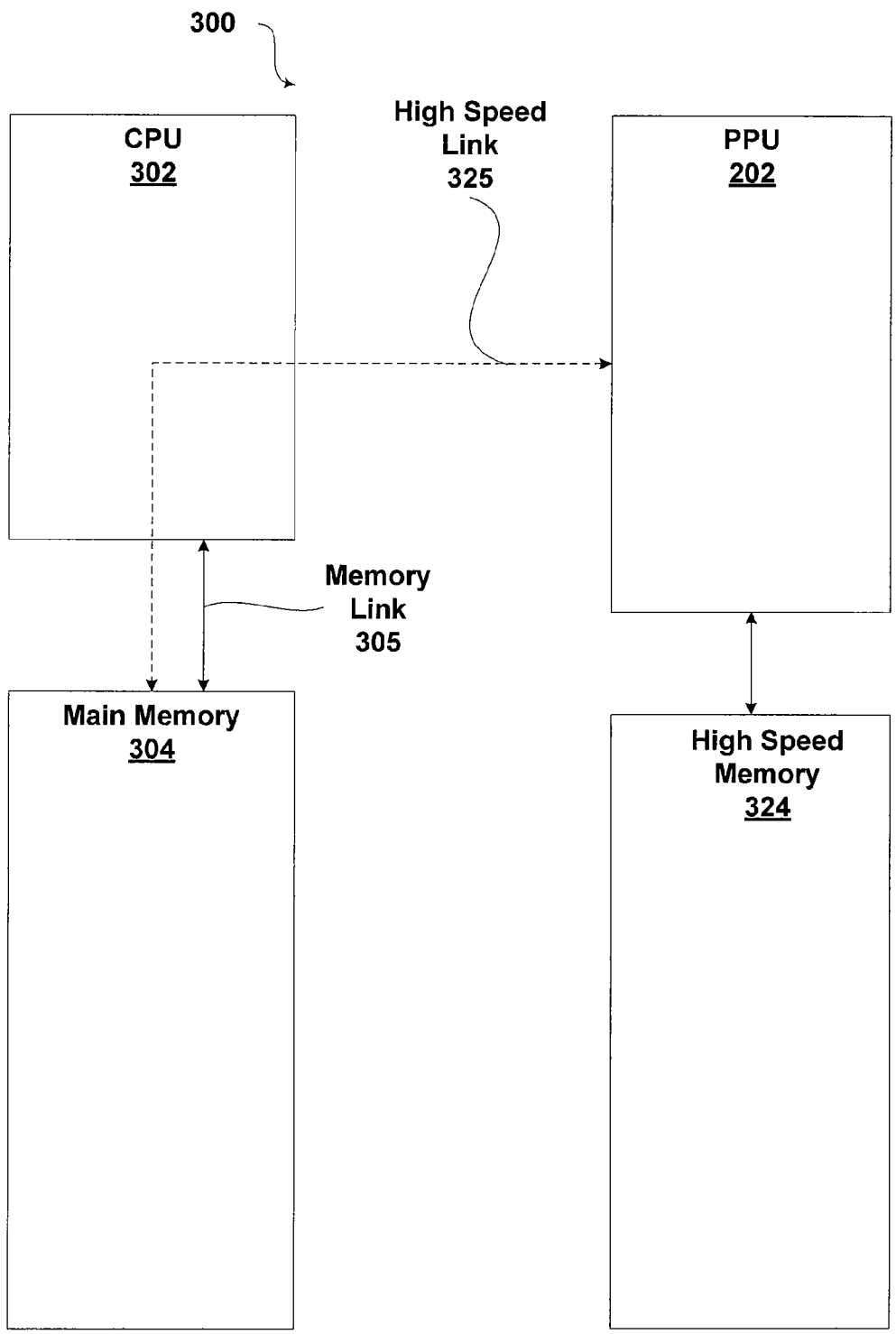
FIG. 3 is a block diagram illustrating a unified virtual memory system with a hybrid memory system, according to one embodiment of the present invention.

FIG. 3 is a block diagram illustrating a unified virtual memory system 300 with a hybrid memory system, according to one embodiment of the present invention. As shown, the unified virtual memory system 300 includes, without limitation, a main memory 104, a high speed memory 324, a PPU 202, and a CPU 302. The PPU 202 and CPU 302 operate substantially the same as described in FIG. 2, except as further described below.

The unified virtual memory system 300 includes a main memory 304 and a high speed memory 324, that together form a hybrid memory system accessible to the PPU 202. The main memory 304 is a relative large and slow memory as compared with the high speed memory 324, which is relatively small and fast. In contrast with the system of FIG. 2, the main memory 304 and the high speed memory 324 are fully mapped to the PPU memory space. As such, the PPU 202 does not incur page faults when accessing either the main memory 304 or the high speed memory 324. As such, in the system of FIG. 300, memory pages migrate between the main memory 304 and the high speed memory 324 in order to improve performance but not in response to page faults.

The PPU 202 has a direct access path to the high speed memory 324 for optimal performance. The PPU 202 accesses the main memory via a high speed link through the CPU 202 to the main memory 304. The PPU 202 may allocate pages within the high speed memory 324 first, so as to achieve better memory performance. As the available memory space in the high speed memory 324 decreases, pages in the high speed memory 324 migrate to the main memory 304. Memory pages from the high speed memory 324 that have not been accessed for a period of time are candidates for migration to the main memory 304. As the available memory space in the high speed memory 324 increases, pages in the main memory 304 migrate back to the high speed memory 324. Memory pages from the main memory 304 that are frequently accessed by the PPU 202 are candidates for migration to the high speed memory 324.

The CPU 302 accesses the main memory 304 via a memory link 305. In addition, the CPU 302 provides a high speed link 325 for the PPU 202 to access the main memory 304.

Figure 4:
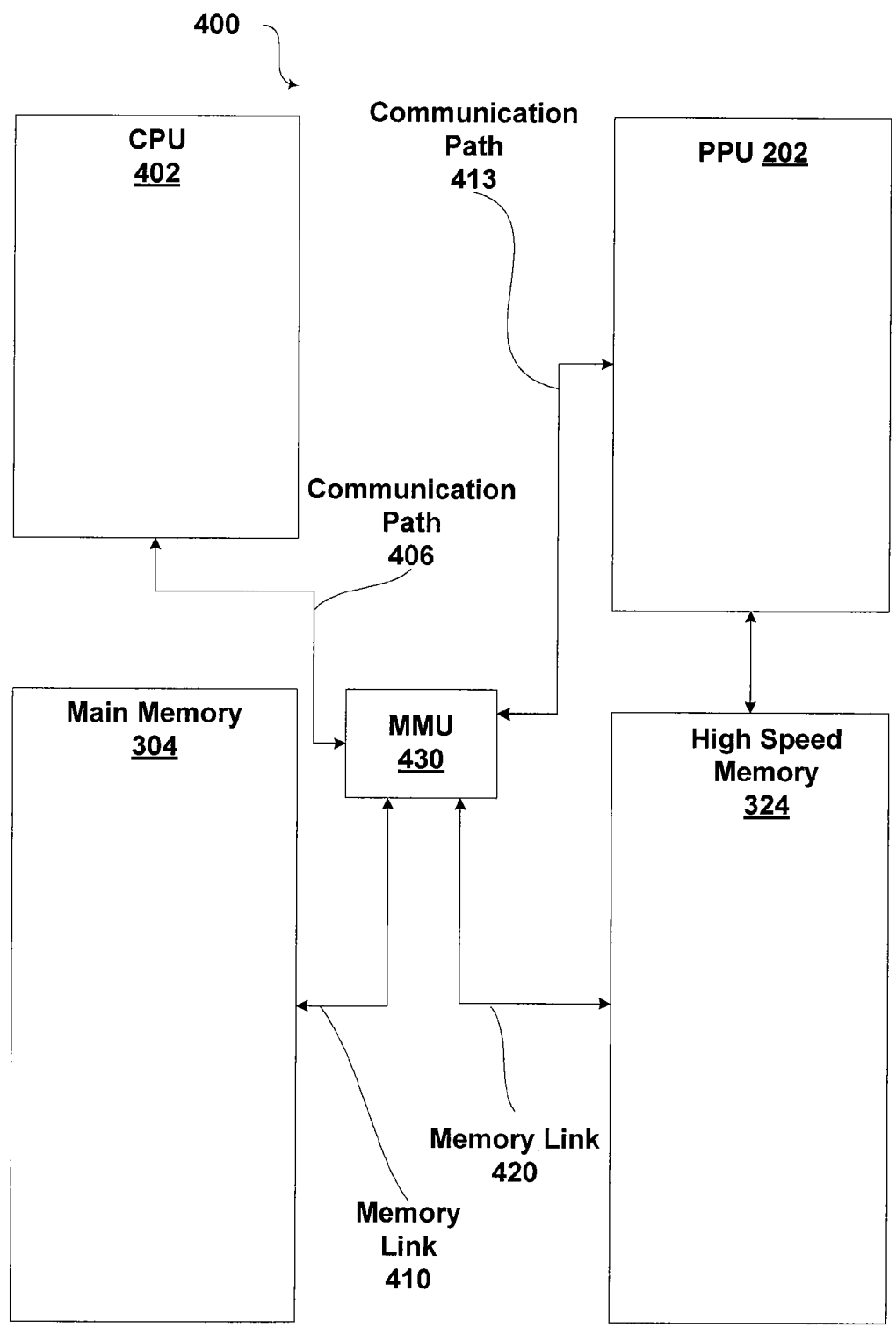
FIG. 4 is a block diagram illustrating a unified virtual memory system with a hybrid memory system, according to another embodiment of the present invention.

FIG. 4 is a block diagram illustrating a unified virtual memory system 400 with a hybrid memory system, according to another embodiment of the present invention. As shown, the unified virtual memory system 300 includes, without limitation, a CPU 402, a PPU 202, an MMU 430, a main memory 304, and a high speed memory 324. The CPU 402, PPU 202, MMU 430, main memory 304, and high speed memory 324 operate substantially the same as described in FIGS. 2-3, except as further described below.

The CPU 402 accesses a hybrid memory system via a communications path 406 to the MMU 430. The CPU 402 accesses the main memory 304 via memory link 410 and the high speed memory 324 via memory link 420. In some embodiments, the CPU 402 is a GPU cluster. Similarly, the PPU 202 accesses the hybrid memory system via a communications path 413 to the MMU 430. The PPU 202 accesses the main memory 304 via memory link 410 and the high speed memory 324 via memory link 420. The two components of the hybrid memory system, that is, the main memory 304 and the high speed memory 324, are each accessed via the MMU 430. The MMU 430 includes a mechanism to monitor memory pages in the high speed memory 324 that are accessed by the CPU 402 and/or not accessed by the PPU 202 for a period of time, where such memory pages are candidates for migration to the main memory 304. The MMU 430 also includes a mechanism to monitor memory pages in the main speed memory 304 that are not frequently accessed by either the CPU 402 and/or frequently accessed by the PPU 202, where such memory pages are candidates for migration to the high speed memory 324. In this way, the MMU 430 migrates pages appropriately to provide improved memory access performance to the hybrid memory system from either the CPU 402 or the PPU 202.

Figure 5:
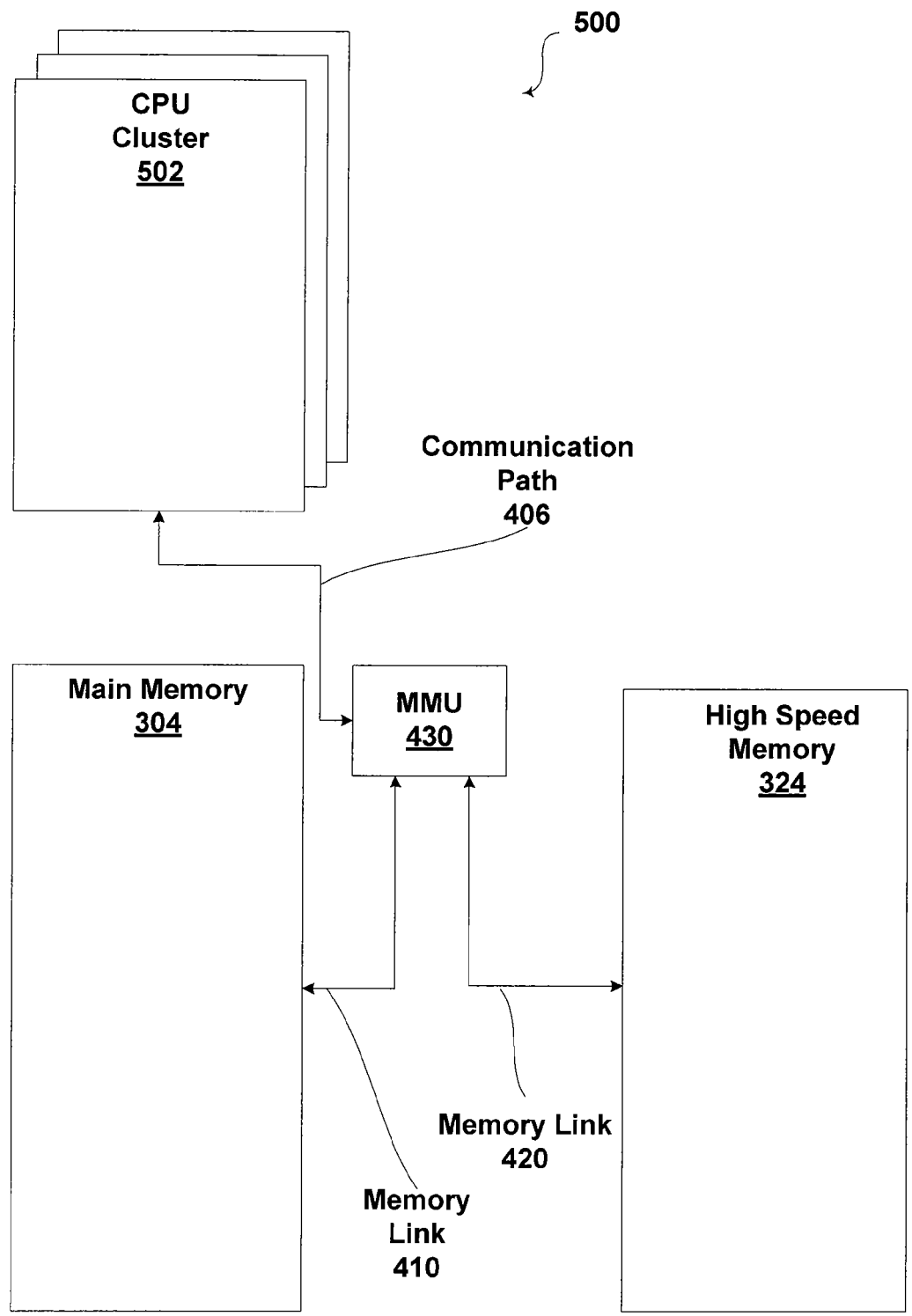
FIG. 5 is a block diagram illustrating a unified virtual memory system with a hybrid memory system, according to yet another embodiment of the present invention.

FIG. 5 is a block diagram illustrating a unified virtual memory system 400 with a hybrid memory system, according to yet another embodiment of the present invention. As shown, the unified virtual memory system 300 includes, without limitation, a CPU cluster 502, a main memory 304, a high speed memory 324, and an MMU 430. The CPU cluster 502, main memory 304, high speed memory 324, and MMU 430 operate substantially the same as described in FIGS. 2-4, except as further described below.

Each CPU in the CPU cluster 502 accesses a hybrid memory system via a plurality of communications paths 506 to the MMU 430. The CPUs in the CPU cluster 502 access the main memory 304 via memory link 410 and the high speed memory 324 via memory link 420. The two components of the hybrid memory system, that is, the main memory 304 and the high speed memory 324, are each accessed via the MMU 430. The MMU 430 includes a mechanism to monitor memory pages in the high speed memory 324 that are not accessed by any of the CPUs in the CPU cluster 502 for a period of time, where such memory pages are candidates for migration to the main memory 304. The MMU 430 also includes a mechanism to monitor memory pages in the main speed memory 304 that are frequently accessed by at least one of the CPUs in the CPU cluster 502, where such memory pages are candidates for migration to the high speed memory 324. In this way, the MMU 430 migrates pages appropriately to provide improved memory access performance to the hybrid memory system from the CPUs in the CPU cluster 502.

Figure 6:
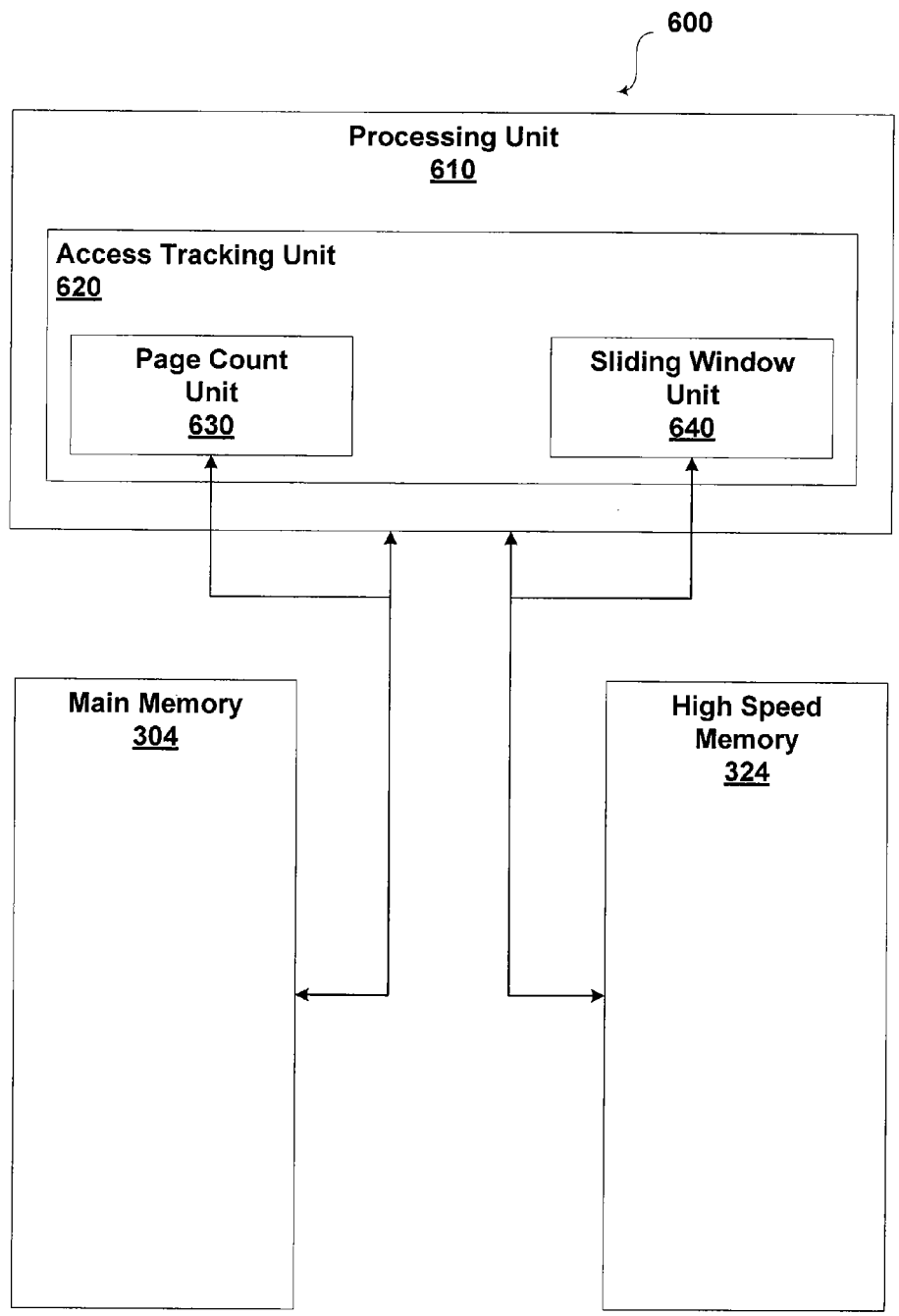
FIG. 6 is a block diagram illustrating a hybrid memory system 600 including migration counters, according to one embodiment of the present invention.

FIG. 6 is a block diagram illustrating a hybrid memory system 600 including migration counters, according to one embodiment of the present invention. As shown, the hybrid memory system 600 includes a processing unit 610, a main memory 304, and a high-speed memory 324. In various embodiments, the processing unit 610, main memory 304, and high-speed memory 324 function substantially the same as corresponding blocks in FIGS. 3-5, except as further described below. The processing unit 610 includes an access tracking unit 620 which, in turn, includes a page count unit 630, and a sliding window unit 640.

The access tracking unit 620 monitors memory access operations directed to the main memory 304, where the main memory 304 is a relatively large, high latency memory. The access tracking unit 620 also monitors memory access operations directed to the high-speed memory 324, where the high-speed memory 324 is a relatively small, low latency memory.

In one embodiment, allocation of memory within the main memory 304 and the high-speed memory 324 may be explicitly managed by the operating system. Memory allocation requests may be first directed to the high-speed memory 324 until the number of unused memory pages in the high-speed memory 324 falls below a pre-determined threshold. When the number of unused memory pages in the high-speed memory 324 falls below the pre-determined threshold, the access tracking unit 620 may identify candidate pages for migration from the high-speed memory 324 to the main memory 304, using the sliding window unit 640.

When the number of unused memory pages in the high-speed memory 324 rises above the pre-determined threshold, the access tracking unit 620 may identify candidate pages for migration from the main memory 304 back to the high-speed memory 324 using the page count unit 630.

The page count unit 630 includes an access cache memory (not shown) for tracking the number of times various memory pages were accessed, where each entry in the access cache memory includes a valid bit, a page frame number, where a page number includes the leftmost bits of a memory address associated with a memory access operation, and a saturating counter that counts the number of times accesses to a corresponding memory page since the page count unit was initialized. In some embodiments, the saturating counter may only count accesses that caused a cache miss or a writeback. In one embodiment, the page count unit 630 tracks a representative sample of memory access operation sufficient to establish a pattern and identify frequently accessed memory pages, rather tracking all memory access operations. Memory pages in the main memory 304 that are accessed more than a threshold number of times during a measurement interval may be candidates for migration from the main memory 304 to the high-speed memory 324. In some embodiments, the number of leftmost bits of a memory address can specify a group of memory pages. In some embodiments, the number of leftmost bits of a memory address associated with a memory access operation is programmable. In some embodiments, the valid bit is not included, and an invalid entry is indicated by the saturating counter having a count of zero.

Two operating system operations (OS operations) may be provided in association with the access tracking unit 630. The first OS operation is an initialize command that causes the access tracking unit 630 to initialize the access cache memory by clearing the valid bits for all cache access entries in the access cache memory. The initialize command may also include a limit value that defines an access threshold. If the number of accesses to a given memory page exceeds the limit value, then the memory page may be flagged for migration from the main memory 304 to the high-speed memory 324.

The second OS operation is a read count values command that causes the access tracking unit 630 to transmit the contents of the valid access cache entries in the access cache memory to the requester. Alternatively, the access tracking unit 630 transmits the contents of all access cache entries in the access cache memory to the requester. For example, if the access cache memory includes sixteen entries, where each entry includes eight bytes per entry, then the returned data would be 128 bytes of data. The transmitted access cache entries include accumulated tracking data from the access cache memory since the most recent initialize command. The optimal number of cache access entries in the access cache memory may be determined empirically.

For each memory access operation directed to the main memory 304, the page count unit 630 determines whether a valid access cache entry exists for the corresponding memory page. If the access cache entry exists, the page count unit 630 increments the page count. If no access cache entry exists, the page count unit creates a new valid entry and initializes the count value. The count value may be initialized to one or any other technically feasible value. If no unused entries in the access cache memory are available, the page count unit may evict a current entry and then create the new value entry in the entry location that formerly held the evicted cache entry. Alternatively, the page count unit 630 may ignore the current memory access operation if the cache access memory is full.

In one embodiment, the page frame number in the access cache memory may be fully associative, such that the saturating counter associated with a current memory access may be quickly identified. Optionally, the saturating counter may be fully associative, such that entries with low count values may be efficiently identified for eviction. Such an approach approximates a most-frequently-used eviction policy. However, other eviction approaches may be used within the scope of this invention.

In one embodiment, the page count unit 630 includes a writable limit register and a total-accesses counter (not shown). The page count unit 630 increments the total-accesses counter each time the processing unit 610 accesses a shared memory page residing in main memory 304. When the total-accesses counter reaches the value stored in the limit registers, the page count unit 630 causes a trap or interrupt to the operating system. The UVM driver 101 may then issue a read count values command to retrieve the contents of the access cache memory. The UVM driver 101 may subsequently issue an initialize command to cause the page count unit 630 to start another tracking interval. The value in the limit register may be set via a parameter included with the initialize command.

In one embodiment, the UVM driver 101 may preset any number of cache access entries in the cache access memory. In another embodiment, the access tracking unit has a memory for storing pages or ranges of pages that are not tracked, and, as such, may not be candidates for migration from main memory 304 to high-speed memory 324.

The sliding window unit 640 detects memory pages in the high-speed memory 324 that are infrequently accessed by the processing unit 610. The sliding window unit 640 tracks access to a sliding window in an address space of the high-speed memory 324. The window location may be defined by the leftmost bits of the address. The window is divided into groups of one or memory pages. For example, each memory page group in the window could include, without limitation, one, two, or sixteen memory pages. Each memory page group corresponds to a different bit in a reference vector. Initially, a window is set by writing a window base address to a window address register and setting the bits of the reference vector to an initial value, such as all zeroes. The window base address includes the leftmost bits of the virtual address associated with a memory access. For example, the window base address could be the leftmost 20 bits of the virtual address, resulting in $2^{20}$ possible window locations. The sliding window unit 640 would track accesses within the address range of one of the $2^{20}$ windows at any given time. At the end of the measurement interval, a memory page associated with a cleared reference bit may be a good candidate for migration from the high-speed memory 324 to the main memory 304. By contrast, a memory page associated with a set reference bit may remain in the high-speed memory 324.

Figure 7A:
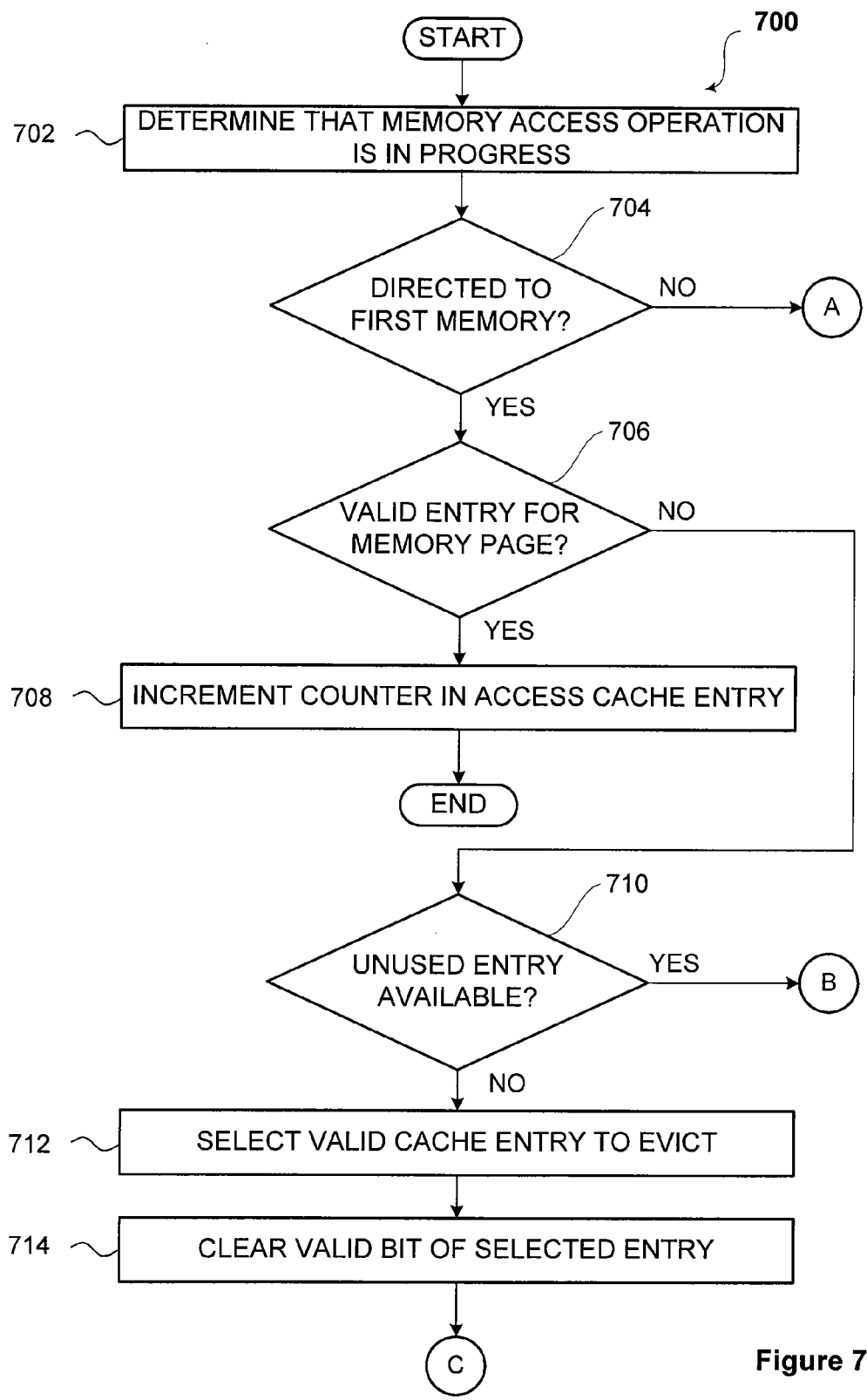
FIGS. 7A-7B set forth a flow diagram of method steps for causing memory pages to migrate between the first memory and the second memory in a hybrid memory system, according to one embodiment of the present invention.
Figure 7B:
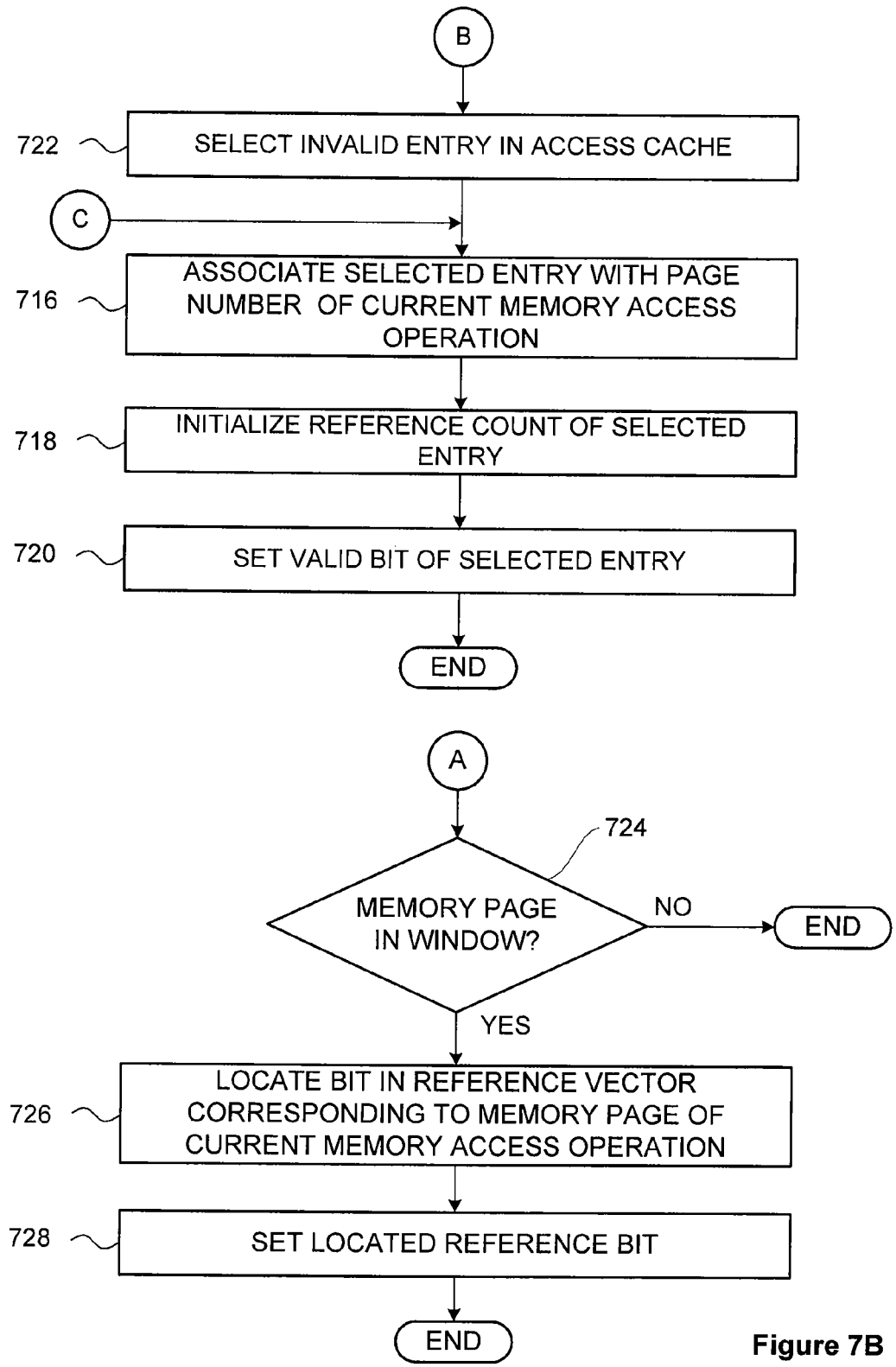

FIGS. 7A-7B set forth a flow diagram of method steps for causing memory pages to migrate between a first memory and a second memory in a hybrid memory system, according to one embodiment of the present invention. Although the method steps are described in conjunction with the systems of FIGS. 1-6, persons of ordinary skill in the art will understand that any system configured to perform the method steps, in any order, is within the scope of the invention.

As shown, a method 700 begins at step 702, where the access tracking unit 620 determines that a memory access operation is in progress. At step 704, the access tracking unit 620 determines whether the memory access operation is directed to the larger first memory. If the memory access operation is directed to the larger first memory, then the method proceeds to step 706, where the access tracking unit 620 determines whether an access cache memory includes a valid entry for the memory page associated with the memory access operation. If the access cache memory includes a valid entry for the memory page associated with the memory access operation, then the method 700 proceeds to step 708, where the access tracking unit 620 increments a counter associated the entry. The method 700 then terminates.

If, however, at step 706, the access cache memory does not include a valid access cache entry for the accessed memory page, then the method 700 proceeds to step 710, where the access tracking unit 620 determines whether the access cache memory includes an unused access cache entry. An unused access cache entry may be indicated by an access cache entry with a cleared valid bit. If the access cache memory does not include an unused access cache entry, then the method 700 proceeds to step 712, where the access tracking unit 620 selects a valid cache entry in the access cache memory to evict. The valid access cache entry may be selected using any technically feasible method, including, without limitation, an access cache entry with the lowest reference count, a randomly selected access cache entry, or an access cache entry selected on a round robin basis. Alternatively, the access tracking unit 620 may evict no access cache entries. In this latter case, accesses to the memory page corresponding to the current memory access operation are not tracked.

At step 714, the access tracking unit 620 clears the valid bit of the selected access cache entry. At step 716, the access tracking unit 620 associates the selected access cache entry with the page number of the current shared memory access operation. In so doing, the access tracking unit 620 stores the page number corresponding to the current memory access operation in the page number field of the selected access cache entry. At step 718, the access tracking unit 620 initializes the reference count field of the selected cache entry. The reference count field may be initialized to zero or to any other technically feasible value. At step 720, the access tracking unit 620 sets the valid bit of the selected access cache entry. The method 700 then terminates.

Returning now to step 710, if the access cache memory includes an unused access cache entry, then the method 700 proceeds to step 722, where the access tracking unit 620 selects an invalid entry in the access cache memory. The method 700 then proceeds to step 716, described above.

Returning now to step 704, if the memory access operation is not directed to the larger first memory, then the memory access operation is directed to the smaller second memory. Accordingly, the method 700 proceeds to step 724, where the access tracking unit 620 determines whether the memory page associated with the memory access operation lies within the window currently being tracked. If the memory page associated with the memory access operation does not lie within the window currently being tracked, then the method 700 terminates.

If, however, the memory page associated with the memory access operation lies within the window currently being tracked, then the method 700 proceeds to step 726, where the access tracking unit 620 locates a bit in a reference vector that corresponds to the memory page. At step 728, the access tracking unit 620 sets the located reference bit. The method 700 then terminates.

In sum, a computing system includes a larger, relative high latency memory and a smaller, relatively low latency memory. An access tracking unit monitors memory access operations directed the larger memory and the small memory. Access operations directed to the larger memory are counted via a page count unit. Memory pages within the larger memory that are accessed with relative frequency as compared with other memory pages are identified as candidates for migration. For example, memory pages that are accessed more than a threshold number of times in a given measurement period could be tagged for migration from the larger memory to the smaller memory.

Access operations directed to the smaller memory are tracked via a sliding window unit. Memory pages within a window of the smaller memory that are not accessed in a given measurement period are identified as candidates for migration. The window represents a portion of the smaller memory that is selected at the beginning of the measurement period. In one example, the sliding unit could track accesses to the smaller memory if the number of available memory pages in the smaller memory falls below a predetermined threshold. The sliding window unit would track accesses to a predetermined window within the smaller memory. Memory pages in the window that are not accessed during the measurement period would be identified for migration from the smaller memory to the larger memory. If the number of available memory pages in the smaller memory is still below the threshold, the sliding window unit could track accesses to memory pages in the same or a different window of the smaller memory.

One advantage of the disclosed approach is that memory pages in a hybrid system migrate as needed to increase overall memory performance. Memory pages accessed with relative frequency migrate from a larger memory with relatively high latency to a smaller memory with relatively low frequency. If the smaller memory fills to a specified threshold level, memory pages not accessed during a measurement interval migrate back to the larger memory.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A subsystem comprising:
an access tracking mechanism configured to monitor access operations directed to a first memory and a second memory by:
detecting an access operation generated by a first processor for accessing a first memory page residing on the second memory;
determining that the first memory page is included in a first subset of memory pages residing on the second memory;
locating, within a reference vector associated with a sliding window representing a subset of address spaces in the second memory, a reference bit that corresponds to a group of memory pages including the first memory page; and
setting the reference bit.

2. The subsystem of claim 1, wherein the second memory stores a driver configured to cause memory pages to migrate between the first memory and the second memory by:
determining that the first memory page has not been accessed for predetermined period of time; and
causing the first memory page to be transmitted from the second memory to the first memory.

3. The subsystem of claim 2, wherein the driver is further configured to cause memory pages to migrate between the first memory and the second memory by:
determining that a second memory page residing on the first memory has been accessed a quantity of times equal to a threshold quantity; and
causing the second memory page to be transmitted from the first memory to the second memory.

4. The subsystem of claim 3, wherein the access tracking mechanism is further configured to monitor access operations directed to a first memory and a second memory by:
detecting an access operation generated by the first processor for accessing the second memory page;
determining whether a cache memory associated with the first processor includes a first entry corresponding to an address associated with the second memory page; and
if the cache memory includes the first entry, then:
incrementing an access counter associated with the first entry and configured to count accesses of the second memory page; or
if the cache memory does not include the first entry, then:
determining whether a second entry in the cache memory is available for allocation; and
if a second entry is available for allocation; then
associating the second entry with the second memory page; and
setting an access counter associated with the second entry to an initial value; or
if a second entry is not available for allocation; then
selecting a first valid entry included in a set of valid entries resident in the cache memory;
clearing a valid bit included in the first valid entry;
associating the first valid entry with the second memory page; and
setting an access counter associated with the first valid entry to an initial value.

5. The subsystem of claim 4, wherein determining whether a second entry in the cache memory is available for allocation comprises determining whether a valid bit included in the second entry has been cleared.

6. The subsystem of claim 4, wherein associating the second entry with the second memory page comprises:
storing a page number associated with the second memory page in the second entry; and
setting a valid bit included in the second entry.

7. The subsystem of claim 4, wherein selecting the first valid entry comprises determining that the first valid entry is associated with an access counter that has the lowest value relative to the values of all other access counters associated with all other valid entries in the set of valid entries.

8. The subsystem of claim 1, further comprising an access tracking unit configured to identify pages for migration using the sliding window.

9. The subsystem of claim 1, wherein the sliding window is divided into groups of one or more memory pages.

10. The subsystem of claim 1, wherein the access tracking mechanism monitors access operations directed to the first memory and the second memory during a first time period and selects the subset of address spaces represented by the sliding window based on the access operations.

11. The subsystem of claim 1, wherein the first reference vector comprises a plurality of reference bits, and wherein each reference bit in the plurality of reference bits corresponds to a different group of memory pages included in the second memory.

12. The subsystem of claim 11, wherein each subset of memory pages included in the plurality of memory pages comprises one memory page.

13. The subsystem of claim 11, wherein each subset of memory pages included in the plurality of memory pages comprises two memory pages.

14. A method for monitoring access operations directed to a first memory and a second memory, the method comprising:
detecting an access operation generated by a first processor for accessing a first memory page residing on the second memory;
determining that the first memory page is included in a first subset of memory pages residing on the second memory;
locating, within a reference vector associated with a sliding window representing a subset of address spaces in the second memory, a reference bit that corresponds to a group of memory pages including the first memory page; and
setting the reference bit.

15. The method of claim 14, further comprising:
detecting an access operation generated by the first processor for accessing a second memory page residing on the first memory;
determining whether a cache memory associated with the first processor includes a first entry corresponding to an address associated with the second memory page; and
if the cache memory includes the first entry, then:
incrementing an access counter associated with the first entry and configured to count accesses of the second memory page; or
if the cache memory does not include the first entry, then:
determining whether a second entry in the cache memory is available for allocation; and
if a second entry is available for allocation; then
associating the second entry with the second memory page; and
setting an access counter associated with the second entry to an initial value; or
if a second entry is not available for allocation; then
selecting a first valid entry included in a set of valid entries resident in the cache memory;
clearing a valid bit included in the first valid entry;

associating the first valid entry with the second memory page; and setting an access counter associated with the first valid entry to an initial value.

16. The method of claim 15, wherein determining whether a second entry in the cache memory is available for allocation comprises determining whether a valid bit included in the second entry has been cleared.

17. The method of claim 15, wherein associating the second entry with the second memory page comprises:

storing a page number associated with the second memory page in the second entry; and setting a valid bit included in the second entry.

18. The method of claim 15, wherein selecting the first valid entry comprises determining that the first valid entry is associated with an access counter that has the lowest value relative to the values of all other access counters associated with all other valid entries in the set of valid entries.

19. A computing device comprising:

a first processing unit;

an access tracking mechanism configured to monitor access operations directed to a first memory and a second memory;

the first memory coupled to the first processing unit; and the second memory coupled to the first processing unit and storing a driver configured to cause memory pages to migrate between the first memory and the second memory by:

determining, based on a reference bit included in a sliding window representing a subset of address spaces in the second memory that a first memory page residing on the second memory has not been accessed for predetermined period of time, wherein the reference bit corresponds to a group of memory pages including the first memory page, and causing the first memory page to be transmitted from the second memory to the first memory.

20. The computing device of claim 19, wherein the driver is further configured to cause memory pages to migrate between the first memory and the second memory by:

determining that a second memory page residing on the first memory has been accessed a quantity of times equal to a threshold quantity; and causing the second memory page to be transmitted from the first memory to the second memory.

21. The computing device of claim 19, wherein the first processor comprises a parallel processing unit, and further comprising a central processing unit coupled to the first processor, and a high speed link that provides the parallel processing unit access to the first memory.

22. The computing device of claim 19, wherein the first processor comprises a parallel processing unit, and further comprising a central processing unit; and a memory management unit that is configured to receive memory access operations directed towards the first memory or the second memory from both the parallel processing unit and the central processing unit.

23. The computing device of claim 19, wherein the first processor comprises a central processing unit, and further comprising a second central processing unit; and a memory management unit that is configured to receive memory access operations directed towards the first memory or the second memory from both the central processing unit and the second central processing unit.

* * * * *